(12) United States Patent
Lam et al.

(10) Patent No.: US 8,401,939 B2
(45) Date of Patent: Mar. 19, 2013

(54) SYSTEM AND METHOD FOR PAYER (BUYER) DEFINED ELECTRONIC INVOICE EXCHANGE

(75) Inventors: Duc Lam, San Jose, CA (US); Ramnath Shanbhogue, Livermore, CA (US); Immanuel Kan, Concord, CA (US); Robert Moore, Pleasanton, CA (US); Xuan McRae, Fremont, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 12/704,177

(22) Filed: Feb. 11, 2010

(65) Prior Publication Data
US 2010/0145839 A1 Jun. 10, 2010

Related U.S. Application Data

(63) Continuation of application No. 10/155,840, filed on May 24, 2002, now Pat. No. 7,689,482.

(51) Int. Cl.
*G07F 7/10* (2006.01)
*G07F 19/00* (2006.01)

(52) U.S. Cl. ......................................................... 705/34
(58) Field of Classification Search .................... 705/34, 705/1.1
See application file for complete search history.

(56) References Cited

U.S. PATENT DOCUMENTS

| | | | |
|---|---|---|---|
| 4,050,375 A | 9/1977 | Orleans | |
| 4,141,078 A | 2/1979 | Bridges et al. | |
| 4,205,780 A | 6/1980 | Burns et al. | |
| RE31,692 E | 10/1984 | Tyburski et al. | |
| 4,694,397 A | 9/1987 | Grant et al. | |
| 4,713,761 A | 12/1987 | Sharpe et al. | |
| 4,807,177 A | 2/1989 | Ward | |
| 4,812,628 A | 3/1989 | Boston et al. | |
| 4,893,333 A | 1/1990 | Baran et al. | |
| 4,939,674 A | 7/1990 | Price | |
| 4,975,841 A | 12/1990 | Kehnemuyi et al. | |
| 4,992,940 A | 2/1991 | Dworkin | |

(Continued)

FOREIGN PATENT DOCUMENTS

| | | |
|---|---|---|
| EP | 0665486 | 2/1995 |
| JP | 2002056063 | 2/2002 |

(Continued)

OTHER PUBLICATIONS

Armstrong, Douglas; Norwest Eases Difficulty of Interstate Banking Bank's Customers May Use the Same Account Number at Any Branch, Milwaukee Journal Sentinel, p. 2, Oct. 12, 1995.

(Continued)

*Primary Examiner* — Seye Iwarere
(74) *Attorney, Agent, or Firm* — Lowenstein Sandler LLP

(57) ABSTRACT

A method of implementing buyer and seller transactions is provided. A set of rules for accepting information into a document is received from the buyer. Also defined is the form of the presentation of an interface to the seller for creating the seller's invoice. The seller also receives address information from the buyer. The rules for accepting information, the rules regarding presentation and the address information are stored in a storage resource. The rules regarding presentation are accessed from the storage resource, and an interface is presented to the seller based on those rules. The rules for accepting information are accessed from the storage resource, and information for the document based on those rules is accepted through the interface. The address information is accessed from the storage resource, and the document with the accepted information is sent to the buyer.

10 Claims, 8 Drawing Sheets

U.S. PATENT DOCUMENTS

| | | | |
|---|---|---|---|
| 5,396,417 | A | 3/1995 | Burks et al. |
| 5,459,482 | A | 10/1995 | Orlen |
| 5,783,808 | A | 7/1998 | Josephson |
| 5,870,725 | A | 2/1999 | Bellinger et al. |
| 5,878,141 | A | 3/1999 | Daly et al. |
| 5,884,290 | A | 3/1999 | Smorodinsky et al. |
| 5,915,246 | A | 6/1999 | Patterson et al. |
| 6,018,718 | A | 1/2000 | Walker et al. |
| 6,045,039 | A | 4/2000 | Stinson et al. |
| 6,047,261 | A | 4/2000 | Siefert |
| 6,058,380 | A * | 5/2000 | Anderson et al. ............... 705/40 |
| 6,064,987 | A | 5/2000 | Walker et al. |
| 6,081,790 | A | 6/2000 | Rosen |
| 6,149,055 | A | 11/2000 | Gatto et al. |
| 6,213,391 | B1 | 4/2001 | Lewis |
| 6,233,565 | B1 | 5/2001 | Lewis et al. |
| 6,301,567 | B1 | 10/2001 | Leong et al. |
| 6,343,279 | B1 | 1/2002 | Bissonette et al. |
| 6,363,164 | B1 | 3/2002 | Jones et al. |
| 6,363,364 | B1 | 3/2002 | Nel |
| 6,363,365 | B1 | 3/2002 | Kou |
| 6,366,967 | B1 | 4/2002 | Wagner |
| 6,390,362 | B1 | 5/2002 | Martin |
| 6,434,159 | B1 | 8/2002 | Woodward et al. |
| 6,460,020 | B1 | 10/2002 | Pool et al. |
| 6,536,663 | B1 | 3/2003 | Lozier et al. |
| 6,554,185 | B1 | 4/2003 | Montross et al. |
| 6,629,081 | B1 | 9/2003 | Cornelius et al. |
| 6,658,393 | B1 | 12/2003 | Basch et al. |
| 6,661,910 | B2 | 12/2003 | Jones et al. |
| 6,728,397 | B2 | 4/2004 | McNeal |
| 6,820,058 | B2 | 11/2004 | Wood et al. |
| 6,826,542 | B1 * | 11/2004 | Virgin et al. ............... 705/34 |
| 6,860,375 | B2 | 3/2005 | Hallowell et al. |
| 6,965,882 | B1 | 11/2005 | Lapstun et al. |
| 6,970,855 | B2 | 11/2005 | Das et al. |
| RE38,957 | E | 1/2006 | Laussermair et al. |
| 7,004,382 | B2 | 2/2006 | Sandru |
| 7,068,832 | B1 | 6/2006 | Price et al. |
| 7,133,846 | B1 | 11/2006 | Ginter et al. |
| 7,194,437 | B1 | 3/2007 | Britto et al. |
| 7,200,255 | B2 | 4/2007 | Jones et al. |
| 7,313,543 | B1 | 12/2007 | Crane et al. |
| 7,317,823 | B1 | 1/2008 | Price et al. |
| 7,337,148 | B2 | 2/2008 | Xie et al. |
| 7,349,884 | B1 | 3/2008 | Odom |
| 7,380,707 | B1 | 6/2008 | Fredman |
| 7,401,048 | B2 | 7/2008 | Rosedale |
| 2001/0011222 | A1 | 8/2001 | McLaugchlin et al. |
| 2001/0018666 | A1 | 8/2001 | Sugiyama et al. |
| 2001/0037300 | A1 | 11/2001 | Miyazaki et al. |
| 2001/0051533 | A1 | 12/2001 | Wietzke et al. |
| 2002/0010666 | A1 * | 1/2002 | Wright ............... 705/34 |
| 2002/0046169 | A1 | 4/2002 | Keresman et al. |
| 2002/0082985 | A1 | 6/2002 | MacKay |
| 2002/0087415 | A1 | 7/2002 | Allen et al. |
| 2002/0100803 | A1 | 8/2002 | Sehr |
| 2002/0116334 | A1 * | 8/2002 | Bennett et al. ............... 705/40 |
| 2002/0128981 | A1 | 9/2002 | Kawan et al. |
| 2002/0143674 | A1 * | 10/2002 | Beckman ............... 705/34 |
| 2002/0169658 | A1 | 11/2002 | Adler |
| 2003/0040959 | A1 | 2/2003 | Fei et al. |
| 2003/0055675 | A1 | 3/2003 | Klein Twennaar |
| 2003/0069780 | A1 | 4/2003 | Hailwood et al. |
| 2003/0130945 | A1 | 7/2003 | Force et al. |
| 2003/0130952 | A1 | 7/2003 | Bell et al. |
| 2003/0144942 | A1 | 7/2003 | Sobek |
| 2003/0163391 | A1 * | 8/2003 | Elkins et al. ............... 705/27 |
| 2003/0200107 | A1 | 10/2003 | Allen et al. |
| 2004/0019561 | A1 * | 1/2004 | Isturiz et al. ............... 705/40 |
| 2004/0078328 | A1 | 4/2004 | Talbert et al. |
| 2004/0133516 | A1 | 7/2004 | Buchanan et al. |
| 2005/0055254 | A1 | 3/2005 | Schmidtberg et al. |
| 2005/0086178 | A1 | 4/2005 | Xie et al. |
| 2005/0091156 | A1 | 4/2005 | Hailwood et al. |
| 2005/0097050 | A1 | 5/2005 | Orcutt |
| 2005/0131780 | A1 * | 6/2005 | Princen ............... 705/30 |
| 2005/0144059 | A1 | 6/2005 | Schuessler |
| 2005/0160031 | A1 * | 7/2005 | Hendrickson ............... 705/37 |
| 2005/0209954 | A1 | 9/2005 | Asher et al. |
| 2005/0261955 | A1 | 11/2005 | Humble et al. |
| 2006/0106650 | A1 | 5/2006 | Bush |
| 2006/0106717 | A1 | 5/2006 | Randle et al. |
| 2006/0136335 | A1 | 6/2006 | Ferguson |
| 2006/0178986 | A1 | 8/2006 | Giordano et al. |
| 2006/0206427 | A1 | 9/2006 | Love et al. |
| 2006/0282389 | A1 | 12/2006 | Gupte |
| 2006/0287953 | A1 | 12/2006 | Chauhan |
| 2008/0193008 | A1 | 8/2008 | Mount et al. |
| 2008/0270273 | A1 * | 10/2008 | Koltunov et al. ............... 705/34 |
| 2009/0106132 | A1 * | 4/2009 | Isturiz et al. ............... 705/34 |

FOREIGN PATENT DOCUMENTS

| | | |
|---|---|---|
| JP | 2002083241 | 3/2002 |
| JP | 2002087536 | 3/2002 |
| JP | 2002508547 | 3/2002 |
| JP | 2002140505 | 5/2002 |
| JP | 2007088822 | 4/2007 |
| WO | 0018060 | 3/2000 |

OTHER PUBLICATIONS

Maturi, Richard; Personal Finance; When You Need to Send Cash in a Flash, New York Times, Sep. 25, 1988.

Hunt, Robert M.; An Introduction to the Economics of Payment Card Networks, Review of Network Economics, vol. 2, Issue 2, Jun. 2003.

Malone, Bridget; Internet Billing: Billing a Secure Golobal Market, Electronic Commerce World, Jan. 2001.

Leibs, Scott; Internet Billing Gets It Due; CFO, The Magazine for Senior Financial Executives, p. 30, vol. 17 No. 2, Feb. 1, 2001.

Business-To-Business Presentment Models and Payment Options, Part One; Presentment Models: Council for Electronic Billing and Payment, Jan. 2001.

Business-To-Business Presentment Models and Payment Options, Part Two: Payment Options; Council for Electronic Billing and Payment, Jan. 2001.

Murphy, Patricia A.; E-Billing: New Age Electronic Data; Interchange or Something Better?: Bank Technology News, vol. 14, No. 7, p. 43, Jul. 2000.

Urrows, Henry; Urrows, Elizabeth; Automated Imaging in Financial Services: Document Image Automation, vol. 11, No. 5, pager 259, Sep.-Oct. 1991.

Buckley, J.P. et al.: Processing Noisy Structured Textual Data Using a Fuzzy Matching Approach; Application to Postal Address Errors; Soft Computing, pp. 195-205, Dec. 2000.

Forbes, Steve; Fact and Comment; Forbes, vol. 170, Iss.6; p. 33, Sep. 30, 2002.

Friedman, Jack P., et al.; Dictionary of Business Terms; pp. 9 & 357, Third Edition, Barrons Educational Series, Inc., 2000.

* cited by examiner

Figure 6

| | 701 | 702 | 703 | 704 | 705 |
|---|---|---|---|---|---|
| 741 | Invoices | Collections | Analysis | Customers | Preference |

| PO Inbox | Create Invoice | View Batch | Exceptions | Disputes | Invoice Status | Reports |
|---|---|---|---|---|---|---|
| 706 | 707 | 708 | 709 | 710 | 711 | 712 |

Invoice Mapping Detail for EDI810

View the mapping details of the invoice.     713

| File Contents: | GS*IN*000000000001*000000000002*20010210*08001X*004010<br>ST*810*10001<br>BIG*20011210*WI00193212*20011210*98765*001<br>REF*CA*123456<br>REF*CR*6035 |
|---|---|

Header   Remit To   Bill To   Line Item   Summary   Trailer

| | 714 | 715 | 716 | 717 | 718 | 719 |
|---|---|---|---|---|---|---|
| | Element ID | Element Code | Required | Data Type | Field Name | Mapped Value |
| 721 | N101 | | ☑ | Alphanumeric | Entity Code ID | PE |
| 721 | N102 | | ☑ | Alphanumeric | Name | Western Telephone |
| 722 | N201 | | | Alphanumeric | Name | |
| 742 / 723 | N202 | | | Alphanumeric | Name | |
| 724 | N301 | | ☑ | Alphanumeric | Address | PO Box 1230 |
| 725 | N401 | | ☑ | Alphanumeric | City Name | Willow |
| 726 | N402 | | ☑ | Alphanumeric | State Code | CA |
| 727 | N403 | | ☑ | Alphanumeric | Postal Code | 95430-1230 |
| 728 | N404 | | ☑ | Alphanumeric | Country Code | USA |

Showing 1–1 of 9

729

| Exceptions: | Quantity in Line Item 1 must be between 15 and 20. |
|---|---|

730

( Submit Invoice )

Figure 7

SYSTEM AND METHOD FOR PAYER (BUYER) DEFINED ELECTRONIC INVOICE EXCHANGE

CROSS-REFERENCE TO RELATED APPLICATIONS

This application is a continuation application of U.S. patent application Ser. No. 10/155,840, filed May 24, 2002. The entire disclosure of U.S. application Ser. No. 10/155,840 is hereby incorporated herein by reference.

In addition, this application is related to the following United States Patent Applications, which are incorporated herein by reference in their entireties:

Method and System for Collaborative Vendor Reconciliation, U.S. patent application Ser. No. 10/155,797, invented by Duc Lam, Georg Muller, Chandra (CP) Agrawal, Baby Lingampalli, Pavel Lopin and Xuan (Sunny) McRae; System and Method for Electronic Authorization of Batch Checks, U.S. Pat. No. 7,518,560, invented by Duc Lam, Matthew Roland and Xuan (Sunny) McRae; System and Method for Varying Electronic Settlements between Buyers and Suppliers with Dynamic Discount Terms, U.S. patent application Ser. No. 10/155,805 (Abandoned), invented by Don Holm, Duc Lam and Xuan (Sunny) McRae; Method and System for Invoice Routing and Approval in Electronic Payment System, U.S. patent application Ser. No. 10/155,853, invented by Bob Moore and Xuan (Sunny) McRae; and Method and System for Buyer-Centric Dispute Resolution in Electronic Payment System, U.S. Pat. No. 7,437,327, invented by Duc Lam, Celeste Wyman and Xuan (Sunny) McRae.

FIELD OF THE INVENTION

This invention relates to the field of software and computer network systems. In particular, the invention relates to electronic systems associated with financial transactions.

DESCRIPTION OF THE RELATED ART

In traditional paper payment systems, an organization or an individual initiates payment by sending a physical check to the party to whom a debt is owed. The check may be sent in response to an invoice from the party to whom the debt is owed. A newer approach is electronic payment. For example, in the consumer context, individuals may be able to make payment by way of electronic banking. Payment instructions are sent electronically from the individual's computer system to the individual's bank. Payment is then effected by the bank.

Numerous systems now exist relating to accounting and bill payment. For example, computer software is used to track invoices and print payment checks. Payments may be made by wire transfer, with instructions requesting funds of the payer in one financial institution to be transferred to an account of the party to whom payment is to be effected.

Enterprise resource planning (ERP) systems are used for managing the purchases of goods and services. Such systems may have databases of complex and extensive sets of information, such as addresses of various suppliers and similar information related to purchasing. Sellers also use electronic accounting and record keeping systems which may assist in the receipt and tracking receipt of payment for goods and services. Prior systems require considerable amounts of effort to update and maintain, and may lack compatibility with the systems used by parties with whom an organization wishes to engage in transactions. There is thus a need for improved systems to facilitate transactions between buyers and sellers.

SUMMARY

An embodiment of the invention is directed to a method of effecting transactions between a buyer and a seller. A set of rules for accepting information into a document is received from the buyer. Also defined is the form of presentation of an interface to the seller for creating the seller's invoice. Address information for shipping to and billing the buyer is also received from the buyer. The rules for accepting information, the rules regarding presentation and the address information are stored in a storage resource. The rules regarding presentation are accessed from the storage resource, and an interface is presented to the seller based on the accessed rules regarding presentation. The rules for accepting information are accessed from the storage resource, and information for the document based on the accessed rules for accepting information are accepted through the interface. The address information is accessed from the storage resource, and the document with the accepted information is sent to the buyer based on the accessed address information. According to one aspect of the invention, the document comprises an invoice. Alternatively, the document may comprise other documents exchanged between the seller and the buyer.

According to one aspect of the invention, status information is exchanged between the buyer and the seller. For example, certain status information regarding the buyer's processing of the document, such as the buyer's processing of the seller's invoice may be exposed to the seller. According to one implementation, a selection of status information that may be exposed to the seller regarding the transaction is received from the buyer. The selected status information is exposed to the seller as the transaction reaches the respective status. In one example, the status information includes status of the processing associated with the transaction in an enterprise resource planning (ERP) system of the buyer. Further, status information from the enterprise resource planning system may be transformed to a status relevant to the transaction based on additional information defined by seller's preferences, and transformed status information may be then exposed to seller. For example, the enterprise resource planning system may indicate that a check is to be paid upon a certain date. If this date has been reached, then the status may be transformed to "ready to pay."

Different business processes may be invoked by the buyer depending on various conditions. For example, a selection may be received from the buyer of different approaches for processing different types of documents. Based on the type of document received from the seller, the document is processed based on the selected approach. The approaches may include rules for routing, editing, and receiving approval for the document in the buyer's organization. The approaches may also include rules for resolving disputes with the seller regarding the document and/or rules for editing the document.

Relevant data may be received from the buyer. For example, particular data regarding the transaction may be received from the buyer, and information may then be accepted from the seller based on the particular data. The particular data may include a set of one or more replacement items that may be provided for an item ordered. For example, where a buyer included a particular item in the invoice, the buyer may indicate that particular replacement items may be provided instead of the specific item ordered. This option is communicated to the seller, and the seller is appropriately notified when the seller does not comply with the constraints of the set of possible replacement items that may be provided for the item. The particular data may also include tolerances for values that may be entered by the seller for particular fields in the document. The tolerances may be based on aspects of a purchase order submitted by the buyer to the seller. Particular data may include severity based mismatch data.

According to one implementation, a mapping may be received from the seller between items in the document and other information. The mapped information may be then displayed to the seller. For example, the seller may possess internal information that is associated with a particular transaction or invoice. However, this information may not be a part of the invoice, and not necessarily automatically displayed to the buyer. The mapping between such information possessed by the seller and items in the invoice allows an implementation of the system to display such information to users in the seller's organization when they are processing the invoice.

According to one implementation of the invention, information is added to the document from a purchase order received from the buyer for the transaction. For example, the document may comprise an invoice, and the display of the form for input of the invoice with the seller may initially be populated with data from the buyer's corresponding purchase order. For example, the invoice may automatically be populated with the name of the buyer and the items, quantities and prices of the items ordered by the buyer. The seller is then able to edit this information to create the invoice. According to different implementations, there may be constraints upon the seller's ability to change information in the invoice or other document created from the purchase order. For example, tolerances may be included in the definition of the invoice from the buyer which define ranges of values or other constraints on the values relative to the item or data in the purchase order. Alternatively, the buyer may specify particular sets of replacement items that may be provided to replace the items originally ordered in the purchase order, and the system may automatically require that the seller provide only such replacement items in the invoice or other document.

The buyer may define different approaches for different types of documents and different sets of sellers. For example, for different types of documents, according to one implementation, different sets of rules are received from the buyer for accepting information into a document from the seller and/or regarding the presentation to the seller. For different sets of sellers, different sets of rules may be received from the buyer for accepting information into a document from the respective different sets of sellers and/or regarding presentation to sellers.

Another embodiment of the invention is directed to a method of effecting transactions between a buyer and a seller involving a file provided by the seller. Address information for shipping to and billing the buyer and a set of rules for accepting information into a document from the seller are received from the buyer. The rules for accepting information and the address information are stored in a storage resource. The rules for accepting information are accessed from the storage resource, and information for the document is automatically accepted from a file provided by the seller based on the accessed rules for accepting information. The document may comprise an invoice or other business document. The file may comprise common separated value (CSV) data or data of other format, such as electronic data interchange (EDI) data.

An embodiment of the invention is directed to a method for effecting a transaction with an invoice between a buyer and a seller. A set of fields is defined for the seller's invoice. An invoice format is defined based on a subset of the set of fields selected by a buyer. Based on selection received in a system associated with the buyer a set of rules is defined for accepting information into respective fields of the invoice. Information is accepted from the seller for fields of the invoice based on the rules and the seller is notified if information provided by the seller is not acceptable based on the rules. The buyer is then provided the invoice with the accepted information and electronic payment is effected from the buyer to the seller based on the invoice.

According to one embodiment of the invention, the rules include whether the information is within a particular range of values from corresponding fields in a purchase order under which items associated with the invoice were ordered. According to one embodiment, the ranges may include a price tolerance.

According to one embodiment of the invention, certain information that is not acceptable is not included in the invoice. According to another embodiment of the invention, information that is not acceptable is selectively (a) included in the invoice upon providing a warning to the seller or (b) not included in the invoice.

According to one embodiment of the invention, rules may include requirements for validation of information for respective fields of the invoice. For example, information may be validated as to whether it contains legal or illegal characters. Other examples of types of validation that may be performed upon information that is attempted to be input into invoice include:

whether a field has an integer value;
whether a field has a zero value;
the number of decimal places in a field;
the range of number in a field;
whether a field has a currency amount;
whether a field has a negative value;
whether a value of a field is within a particular range;
whether a field has a representation of a date value;
whether a date in a field is in a particular range;
whether a field has a representation of a state;
whether a field has a representation of a particular set of states;
whether a field has a representation of a postal code;
whether a field has a representation of an e-mail address;
whether a field has a representation of a telephone number;
whether a field has a representation of a payment term code;
whether a field has a representation of a SKU catalog number;
whether a field has a representation of a cost center; and
whether a field has a representation of a department.

Invoice information from the seller may be obtained in various ways according to various embodiments of the inventions. For example, invoice information may be obtained over a web-based form. Alternatively, information may be obtained over a form created from a purchase order of the buyer. Also, information may be obtained from a file maintained by the seller with information for the invoice or other invoices and translated into the invoice through a mapping process. The invoice format may be displayed differently to different sellers depending on membership of the sellers in groups defined by the buyer.

An embodiment of the invention is directed to a data structure. The data structure includes a set of invoice fields. For each field in the set, the data structure includes a rule regarding whether information is acceptable for inclusion in the field of the invoice and an indication of whether violation of the rule results in a rejection of the submitted information or only a warning.

BRIEF DESCRIPTION OF THE DRAWINGS

FIG. 6 shows a user interface with an invoice display according to an embodiment of the invention.

FIG. 7 is an illustration of a user interface for invoice mapping according to an embodiment of the invention.

DETAILED DESCRIPTION OF THE DRAWINGS

Figure 1:
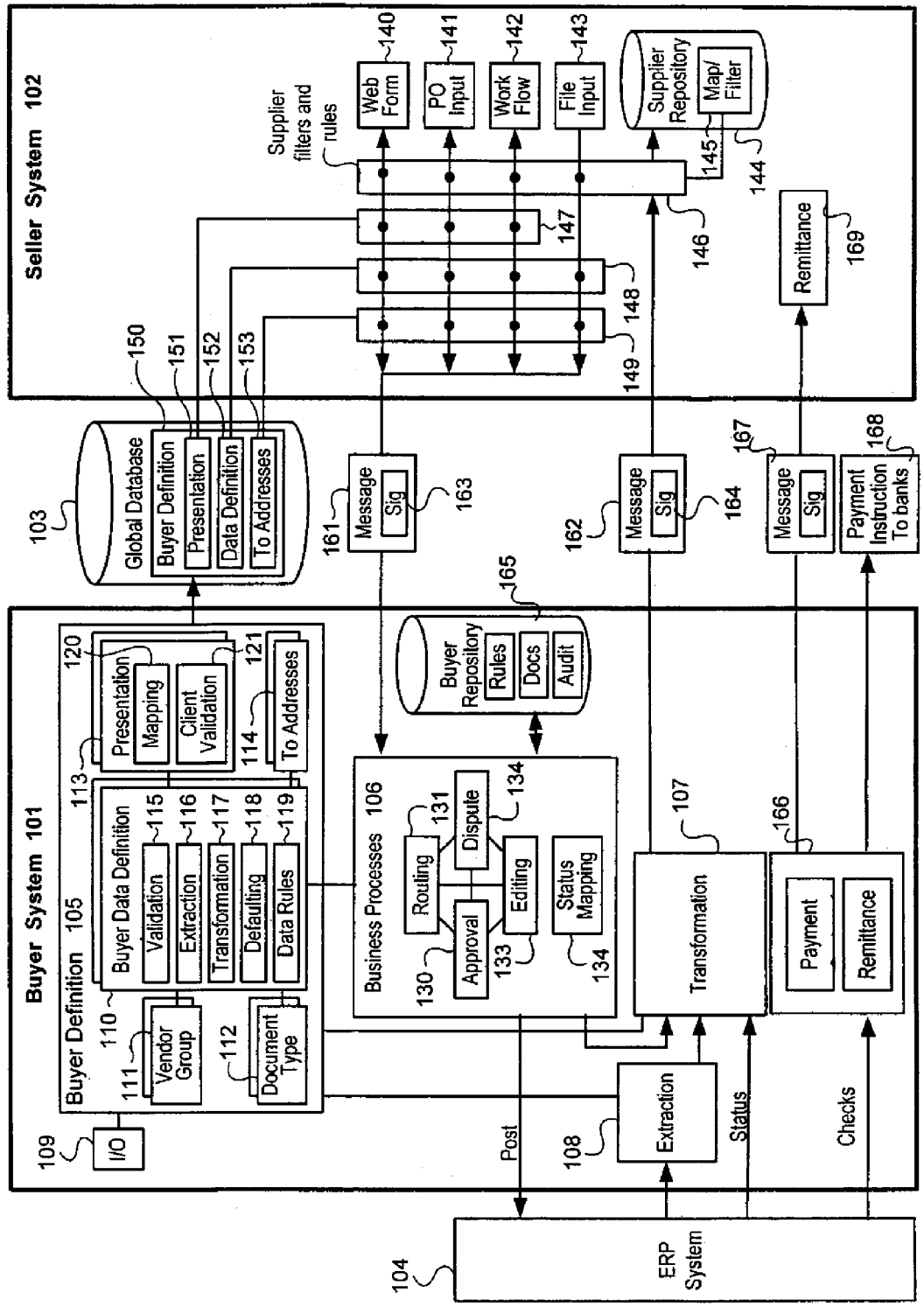
FIG. 1 is a functional block diagram of payer (buyer) defined invoice exchange system according to the invention.

An embodiment of the invention is directed to a system that allows an entity that is making a payment to define the form of the invoice that it will receive from the party to whom it is paying. The party that is paying defines the invoice electronically and when the other party bills this party, this defined invoice format is used. This defined invoice format may include a set of rules that require certain information to be included in the invoice. These rules are defined by the party that is paying, and the rules determine whether the party to whom the funds are paid is able to input information into the invoice.

Thus, for example, an embodiment of the invention includes a system that allows a buyer to define its invoice form that the buyer will receive from the seller. The seller uses this invoice that is defined by the buyer. The invoice has associated rules that determine whether data may be accepted into this invoice as the seller attempts to input information. The rules are defined by the buyer. An advantage of this approach is that it can allow quicker approval of the invoice by the buyer because the invoice is already in a format preferred by the buyer and contains data that meet criteria acceptable to the buyer. Efficiency is also achieved in one embodiment of the invention because the buyer is receives a standard of invoice that is compatible with its management processes and data systems.

A buyer may define additional information and make that information available for other parties, such as sellers. For example, a buyer may create a definition for communication with the buyer that includes rules for data validation, extraction, transformation and other processing. The definition provided by the buyer may also include rules for presentation of documents to other parties, such as the presentation of a form of an invoice to a seller. The presentation definition may include definitions of how data is mapped from other sources to the data in the document, as well as a definition of how data is validated in the presentation process. Additionally, the buyer may define a set of addresses to which information or items are sent for the buyer. For example, a buyer may define and publish an address or addresses to which bills are sent as well as an address or addresses to which goods are shipped.

Such definitions of data processing, presentation and addresses may be linked to particular groups of parties with whom the buyer interacts as well as with particular types of documents. For example, a particular definition may be linked to a set of sellers with whom the buyer interacts, and another definition may be linked to another set of buyers with whom another set of sellers with whom they buyer interacts. Alternatively, particular definitions may be linked to a single other entity, such as a single supplier. Particular definitions regarding data processing, presentation and shipment may also be linked to particular types of documents such as invoices, shipment documents, receipt confirmation documents and different sub-types of such documents.

In one example of use of an embodiment of the invention, a buyer first defines the format by which it receives data, the presentation format provided to sellers and the addresses to which goods and billing are sent. A seller logs on to its system to send an invoice to the buyer and is presented with an interface formatted according to the buyer's presentation definition. The seller enters information into the invoice creation interface and receives responses based on the data definition defined by the buyer. For example, the seller may get a warning that the information entered in a particular field is invalid, according to the buyer's definition. The seller completes the document through the interface and, according to one implementation, signs the invoice. The invoice is sent to a central repository which is accessible to the buyer's system. Based on the buyer's definition, particular processes are triggered in the buyer's system that relate to routing, approval and editing of the invoice as well as dispute resolution regarding the invoice. The buyer personnel may interact with the invoice and take actions directed by the processes that have been initiated. Additionally, the invoice and status regarding invoice may be posted to the buyer's enterprise resource planning (ERP) system during and after the processing. As the buyer processes the invoice and takes other actions related to the transaction, certain status information is exposed to the seller, based on the buyer's definition of transformation of its status to the seller.

According to one aspect of the invention, processing which may have occurred in the buyer's accounts payable system takes place before the buyer receives the respective document, such as the invoice. Since the buyer is able to define the data validation, and the data is validated by the seller in advance to sending it to the buyer, the buyer receives information in a form closer to what is required by the buyer for its own processing. The buyer also may define the form of the presentation of the creation of the document by the seller, and such form may form may help the seller to better enter the data requested by the buyer. Since, according to one implementation, the buyer may define the data definition, presentation and amount of filtering with respect to status information that is provided to a seller, and since the buyer may make such definition depending on whether the seller is a member of a pre-defined group, the buyer is better able to manage its relationship with its suppliers. Since the definitions provided by the buyer may be stored in a storage resource that is accessible to multiple other parties, such as the buyer's suppliers, the buyer is able to update this information and have it used promptly by its suppliers without being required to individually notify all of its suppliers regarding the new approach.

FIG. 1 is a block diagram of a system including a buyer system, seller system and global database according to an embodiment of the invention. FIG. 1 includes buyer system 101, seller system 102, ERP system 104, global database 103, message 161 and message 162. Seller system 102 includes web form logic 140, P.O. input logic 141, work flow logic 142 and file input logic 143. Seller system 102 also includes presentation logic 147, data definition logic 148, to address logic 149, mapping/filtering logic 146 and supplier repository 144. Global database 103 includes buyer definition 150, which includes presentation definition 151, data definition 152 and to address 153.

Buyer system 101 includes buyer definition 105, business process logic 106, transformation logic 107, extraction logic 108 and input output (I/O) 109. Buyer definition 105 includes buyer data definition 110, presentation definition 113 and to address 114. A different buyer definition 110 may be provided for different vendor groups. Thus, buyer data definition 110 is linked with vendor group 111. Similarly, there may be different buyer data definitions 110 for different types of documents. Thus, buyer data definition 110 is linked with document type 112. An example of a document type include invoice, purchase order, advance shipment notice, etc. Buyer data definition may have multiple addresses to which items, such as bills or goods are shipped. Thus, buyer data definition is linked to various to addresses, such as to address 114. To address includes: bill to and ship to addresses. Buyer data definition 110 includes definitions of various aspects of data and information processing with respect to the buyer, and thus includes validation definition 115, extraction definition 116, transformation definition 117, defaulting definition 118 and data rules 119. Buyer system includes logic to control various business processes running on buyer system 101 and otherwise used with respect to the buyer. These processes are controlled by business processes logic 106, and include processes for routing, approval, dispute resolution and editing as controlled by modules routing logic 131, approval logic 130, editing logic 133 and dispute resolution logic 134. Status mapping at logic 134 is also included in business processes logic 106. All business process rules (routing, editing, approval, and visibility) are stored in the buyer central repository under rules section shown as 165

The following are some of the interrelationships between elements in seller system 102. Presentation definition logic 147, data definition logic 148 and to address logic 149 are coupled respectively to receive information from presentation definition 151, data definition 152 and to address 153 of buyer definition 150 in global database 103. Mapping/filtering logic 146 is coupled with mapping/filtering definition 145, which is supplied in a storage resource supplier repository 144 of seller system 102. Web form logic 140, P.O. input logic 141 and work flow logic 142 are coupled with mapping/filtering logic 146, presentation definition logic 147, data definition logic 158 and to address 149. File input logic 143 is coupled with mapping/filtering logic 146 provided by seller, data definition logic 148 and to address logic 149.

The system shown allows for a buyer to define ways that it receives data, initiates processes and shares information with respect to transactions with other parties such as the buyer's vendors. Through an input/output, such as input/output (I/O) logic 109, the buyer defines rules with respect to validation of data in documents, extraction of information from the buyer's systems (such as the buyer's enterprise resource planning system), transformation of status information and other data from the buyer's system to the seller's system. Defaulting rules with respect to data entry and receipt and data rules with respect to the way that data is received and processed. Definitions of these items are stored in buyer data definition 110 in items validation 115, extraction 116, transformation 117, defaulting 118 and data rules 119. The buyer may also define the presentation that the input of the information for the respective document to be received by the buyer. Such definition is stored in presentation definition 113 and includes mapping 120, which defines mapping between various data values, and client validation 121, which defines which forms of validation of data occur at the other party's system. To address definition 114 defines addresses to which information or goods are sent to the buyer for the particular data definition.

The buyer may have multiple buyer data definitions 110. Such different data definitions may be created for different vendor groups, thus, a link is present between vendor group 111 and buyer data definition 110. Similarly, different buyer data definitions may exist for different document types, and therefore, a link exists between document type 112 and buyer data definition 110. Some of the data for particular data definitions may come from other sources, such as the ERP system in the case of a purchase order. Thus, buyer data definition is linked with extraction logic 108, which obtains information for ERP system 104.

The buyer definition is published to a storage resource accessible to other parties, such as global database 103, which is accessible from seller system 102. Thus, global database 103 includes buyer definition 150, with buyer-approved presentation definition 151, data definition 152 and to address 153. This definition is then available to seller system for creation of documents to be sent to a buyer in accordance with buyer definition 150.

The seller may create documents through various forms of input and interaction. For example, the seller may create documents through inputs such as (a) a web based form, (b) a form which is created by the inversion of a purchase order into a template for invoice, (c) a work flow process where the document and actions to create the document are distributed through different personnel at the seller's organization and (d) extraction of a file and conversion into the proper form. Such forms of input are handled by web form logic 140, P.O. input logic 141, work flow logic 142 and file input logic 143 respectively. These modules are in communication with data definition logic 148 and to address logic 149 in order to properly receive and validate data and send the resulting document to the proper address, as defined by the buyer. Web form logic 140, P.O. input logic 141 and work flow logic 142 are coupled with presentation definition logic 147 in order to display and input interface to the user of the seller's system in accordance with the definition of the presentation created by the buyer. Thus, the buyer is able to control at least some aspects of the interface that is presented to the seller for input of information for the document that will be eventually sent to the buyer.

Additionally, the seller may define a mapping between other information, such as possibly information in the seller owned system and information in the document. Such mapping is stored in map/filter structure 145 and supplier repository 144. Using this data, mapping logic one mapping/filter logic 146 maps data maps other data to the document that is being created by the seller. For example, internal reference numbers in seller system 102 may be mapped to the respective invoice that is being created by the seller. These internal reference numbers are then made available at a later time as the invoice continues to be processed by seller system 102, according to one implementation.

After the document is prepared based on the buyer definition 150, it is encrypted and sent in an electronic form, such as message 161 to buyer system 101. According to one implementation, message 161 includes a digital signature 163. This digital signature can be later verified by the buyer to verify that the message was received from the seller or from the particular seller. Other forms of electronic communication with respect to the document are possible between buyer system between seller system 102 and buyer system 101, according to different embodiments of the invention.

When the document is received by buyer system 101, it is processed according to various possible business processes.

Business process logic 106 initiates the processes and controls such processes in accordance with the buyer definition 105 and in response to the type of document and seller membership of the seller and a particular vendor group. The processing includes routing, approval, dispute resolution and editing, which are driven by modules routing logic 131, approval logic 130, dispute resolution logic 134 and editing logic 133 respectively. Complete history and audit trail of each transaction are stored in buyer central repository shown as 165.

Status mapping 134 maps between various statuses within the business process and other aspects of processing of the document and designations for such status that are used to notify the buyer and the seller. Transformation logic 107 sends messages with regarding the status of the processing of the document to seller system 102. Such transformation includes a function of mapping various forms of status to the respective form that is understood better by the seller or other party to whom the status is sent. Other status information, such as status in ERP system 104 is also transformed by transformation logic 107 in accordance with buyer definition 105. Filtering takes place in transformation logic 107 in transformation logic 107 in accordance with buyer definition 105. The filtering determines which status information is sent, and which status information is not sent and which status information is exposed, which status information is not exposed to the seller or other party receiving information from the buyer.

Status information and other information is encrypted and sent to seller system 102 from buyer system 101 as an electronic message. For example, the information may be sent as message 162 which includes digital signature 164. The digital signatures provided in message 162 and in message 161 help to prevent repudiation of the message by the respective party that sent it. In response to status messages, seller system updates its repository such messages, supplier repository 144. Such updating may occur through a filtering process managed by mapping/filtering logic 146 in communication with map mapping/filtering structure 145.

Upon ERP releases the payment, both payment and remittance information shown as 166 will be encrypted, signed, and set to seller as shown in 167. Remittance information will be sent to seller (168), while payment information (169) will be sent to buyer's bank authorizing fund transfer.

Figure 2:
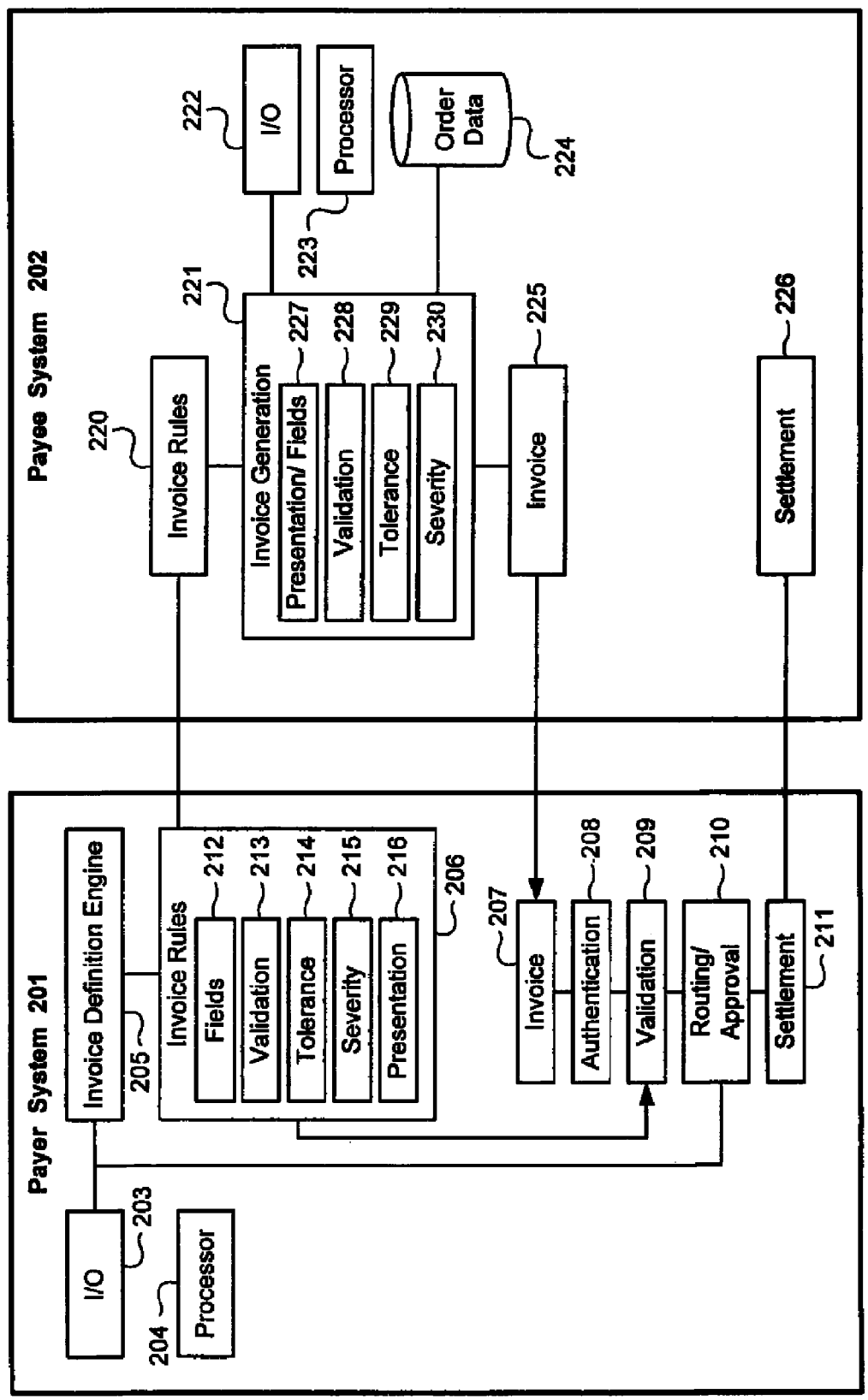
FIG. 2 is a block diagram of a system including a payer system with invoice definition engine and a payee system which generates an invoice according to an embodiment of the invention.

FIG. 2 is a block diagram of a system including a payer system with invoice definition engine and a payee system which generates an invoice according to an embodiment of the invention. FIG. 2 includes payer system 201 and payee system 202. Payer system 201 includes input output (I/O) 203, processor 204, invoice definition engine 205, which is coupled to I/O 203 and invoice rules 206.

Payer system 201 includes invoice 207, which is sent by payee system 202 as invoice 225. Payer system also includes authentication logic 208, validation logic 209, and routing/approval logic 210, which process invoice 207. Payer system includes settlement logic 211, which operates with items that have been routed or processed by routing/approval logic 210. Settlement logic 211 is in communication with settlement logic 226 of payee system 202. Invoice rules 206, which are generated by invoice generation engine 205, are operative with invoice rules 220 of payee system 202. Invoice rules 206 include fields 212, validation 213, tolerance 214, severity 215 and presentation 216.

Payee system includes invoice rules 220 which are operative with invoice generation logic 221. Invoice generation logic 221 produces invoice 225. Invoice generation logic 221 is coupled with input output (I/O) 222 for presentation on a user interface. Payee system 202 also includes processor 223.

The various functions shown may be implemented as software processes run by processor 204 and processor 223 on payer system 201 and payee system 202, respectively. Such processes may be written as software objects, routines or a combination thereof. Various elements shown and described may be implemented in data structures in computer memory or storage such as volatile computer memory or a fixed storage device such as a hard drive, combination thereof or other form of information storage and retrieval. Combinations of electronic hardware and software implementations of the foregoing technology may be provided as well according to other aspects of the invention described herein.

An invoice is defined in payer system 201. Invoice definition engine 205 in cooperation with input output (I/O) 203 presents a user of payer system 201 with the opportunity define the format of the invoice and create a corresponding set of rules as shown here invoice with invoice rules 206. The invoice rules include the set of fields 212, as well as a set of validation rules 213 which determine whether particular information input into respective fields is acceptable according to the invoice definition. Invoice rules include tolerance 214 which determines whether particular information for a particular field is acceptable based on, in one implementation, a range of values. For example, a tolerance of a range of values around a purchase order value may be set such that a price is not acceptable if it is not within the range.

A severity rule determines, depending on the selected severity, how a violation of the rule is treated. For example, the severity may be set such that when a value for the field is not acceptable, the invoice is not allowed to be completed. Alternatively, severity may be set such that when the value for the expective field that is attempted to be input is not acceptable, a warning is provided to the user at the payee system 202 but the data is nevertheless accepted. Presentation rules 216 determine the format of presentation of the respective invoice. For example, certain information may be provided only to certain groups of sellers.

Invoice rules 206 are communicated with payee system 202, as shown as invoice rules 220 in payee system 202. Based on such invoice rules 220, invoice 225 is generated in payee system 202 by invoice generation logic 221. Invoice generation logic 221 includes presentation/fields logic 227, which presents the respective fields from invoice rules 220. The presentation allows for input of values into those fields. Purchase order data received by payee and present in payee system 202 may be provided as input to the invoice. As shown here, order data 224 is available to invoice generation 221. Validation logic 228 of invoice generation 221 applies validation rules to the attempted input of invoice information in payee system 202. Tolerance logic 229 applies the tolerance rules to the respective invoice information that is attempted to be input into the respective field of invoice 225 in payee system 202.

Severity logic 230 applies the severity rule to the attempted input into the field. For example, if the severity is set to require the value to meet the validation criteria before is accepted, the value will not be accepted until unless it meets the validation criteria. Otherwise, if the severity is set to provide a warning under such circumstances, only a warning is provided and the data and the information is nevertheless accepted.

Invoice 225 is created by invoice generation 221 and is provided to payer system 201 as invoice 207. After receipt, invoice 207 is authenticated by authentication logic 208. Authentication may involve determining that the invoice is an invoice that actually came from payee system 202. Such authentication may involve using digital signature verification. For example, in one implementation invoice 225 is digitally signed by with a digital signature of the payee. Payer system 201 then decrypts the signature using the public key of the payee corresponding to the private key that was used by the payee to create the digital signature. If the decrypted signature matches the invoice document, the invoice is authenticated. Next, the invoice is validated in one implementation to recheck compliance with the respective invoice rules. An advantage of the embodiment of the invention is that if the invoice is generated by payee system according to invoice rules 220, validation step 209 may not typically find errors that would otherwise be present were it not for such use of invoice rules by payee system 202.

The invoice is routed for approval within payer system 201 by routing/approval logic 210. Such routing may use electronic mail to route the invoice to employees for approval for the invoice as needed before payment can be made. Routing may also involve escalating the approval to the appropriate manager of the employee in the event that the employee who is responsible has not approved the invoice in a particular time for example, in one implementation, within one day. The time is adjusted according to the value of savings from prompt response to invoices. Also, an invoice may require approval from multiple employees, such as a purchasing manager as well as the employee ordered the respective goods. Routing may also involve provisions for vacations and delegation. For example, according to one implementation, an administrator or other user can specify that when particular users are on vacation, the invoice or other document is routed to another designated user. Also, according to an implementation of the invention, a user can delegate authority or responsibility for handling invoices or other documents to another user. Then the invoice is routed to such employee or other user to whom the authority and/or responsibility has been delegated.

After approval of the invoice, payment may be made. Payment is facilitated by settlement logic 211, which is operative with settlement logic settlement logic 226 of payee system 202. Settlement may take place by way of interaction with an electronic settlement network. Alternatively, settlement may take place through debits and credits. In such an implementation, the respective amounts owed are debited and credited between payer between the payer and the payee. In one implementation, such functionality is provided internally. In another implementation an external server is used.

Figure 3:
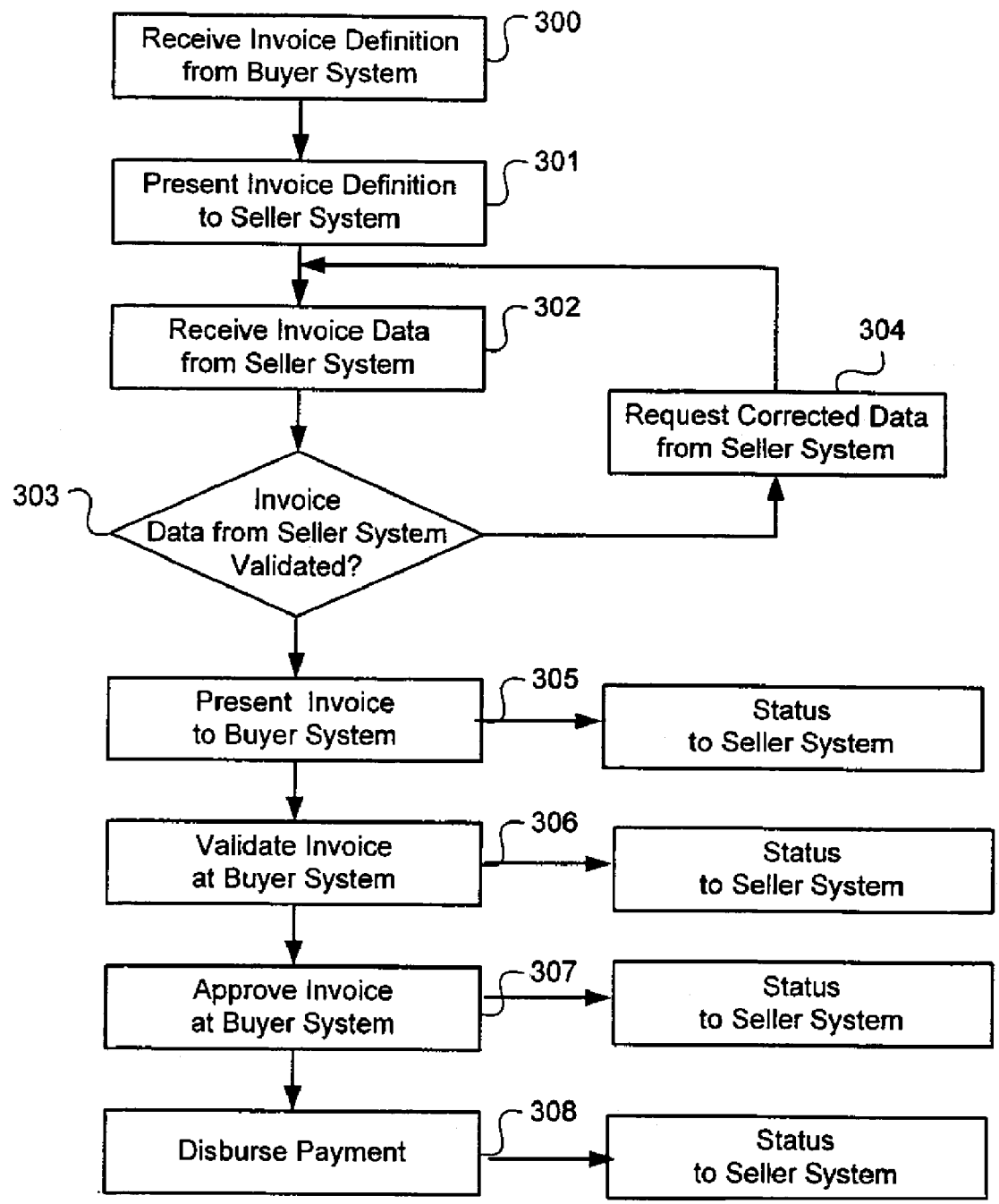
FIG. 3 is a flow diagram of invoice definition and generation according to an embodiment of the invention.

FIG. 3 is a flow diagram of invoice definition and generation according to an embodiment of the invention. According to such an implementation, an invoice definition from a buyer system is received, and an invoice is created in the seller system based on the definition. This invoice is then presented to the buyer for payment. An invoice definition is received from the buyer system (block 300). The invoice definition is presented to the seller (block 301). The presentation to the seller may be in the form of a web interface. Alternatively, the presentation may be in the form of a window interface in a personal computer system. The presentation of the invoice definition may also be in electronic form that is used internally by software agents preparing electronic invoices automatically.

Invoice data is received from the seller system (block 302). The invoice data is tested as to whether it is validated under the rules in the invoice definition. If the invoice data is not validated (block 303), corrected data is requested from seller system (block 304). If invoice data from seller system is not validated, corrected data is requested (block 304) and invoice data is received from seller system block (block 302) until invoice data from the seller system is validated (block 304). If invoice data from the seller system is validated (block 303), then the invoice is presented to the buyer system (block 305).

The invoice data is optionally validated at the buyer system (block 306). The invoice is approved at the buyer system (block 307). After such approval and validation, payment is dispersed (block 308).

Figure 4:
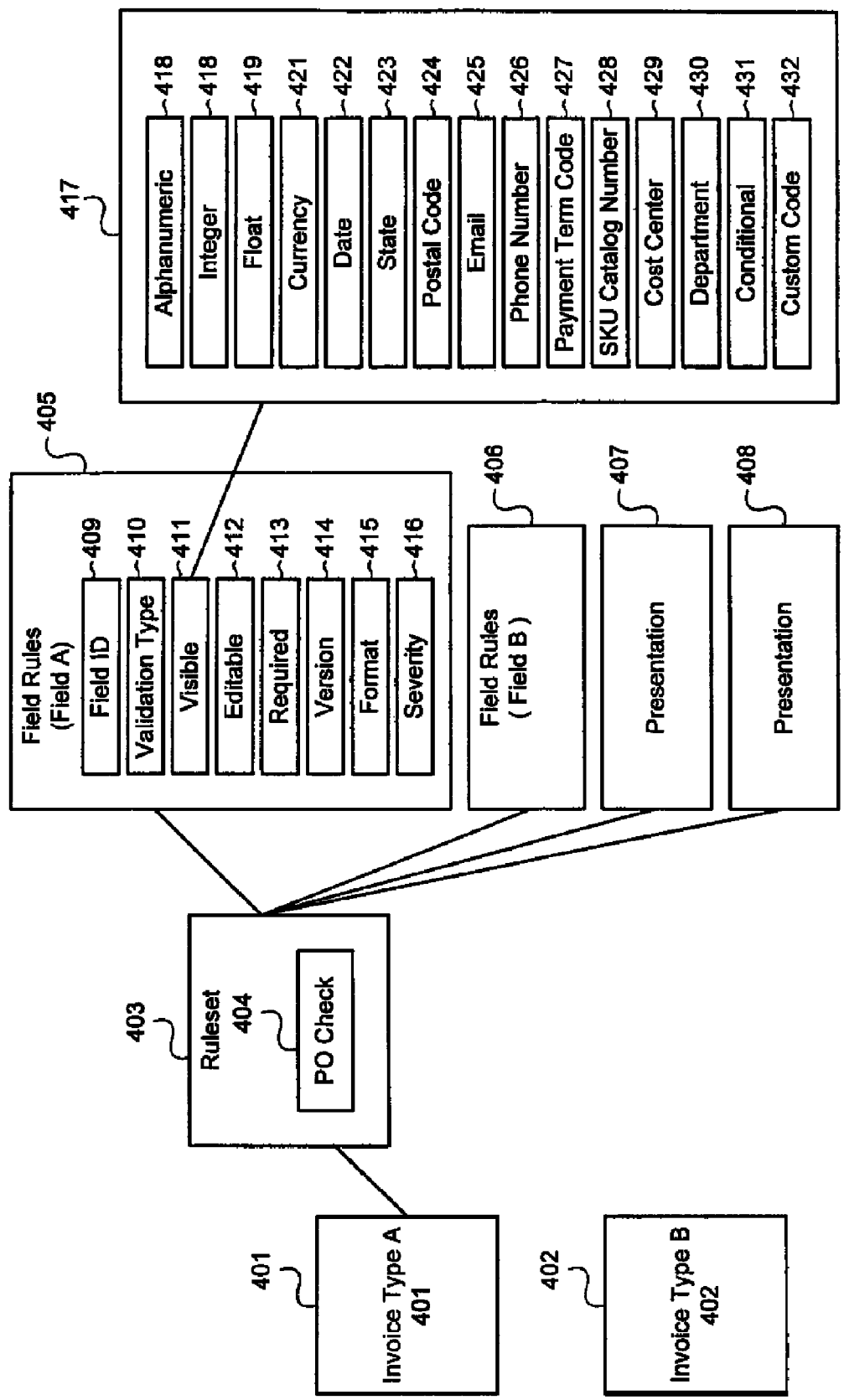
FIG. 4 is a data and rule relationship diagram according to an embodiment of the invention.

FIG. 4 is a data and rule relationship diagram according to an embodiment of the invention. The system may use a number of different invoice types. For example, in FIG. 4 invoice type A 401 and invoice type B 402 are shown. An invoice type has at least an associated rule set, for example, rule set 403 which is associated with invoice type A 401. A rule set, such as rule set 403 has, according to an embodiment of the invention, a set of rules for each field within the rules set. For example, here are shown rules for field A rules 405 and field B rules 406.

Field rules include various field rules for the field. For example, according to one embodiment of the invention field rules include a field identification 409, validation type 410, visible flag 411, editable flag 412, required flag 413, version flag 414, format designation 415 and severity flag 416. Validation type 410 includes a rule for validation of the respective field entry when it is provided. Different types of validation may be selected among. When such a particular validation type is selected, it is then used to check for compliance of the respective information that is attempted to be input. For example, here are shown a number of possible validation types for a field: alphanumeric 418, integer 419, float 422, currency 421, date 422, state 423, postal code 424, email 425, phone number 426, payment term code 427, SKU catalog 428, cost center 429, department 430, conditional 431 and custom code 422.

Based on the selection of the respective field validation type, the information is validated for conformance with the type. For example, for alphanumeric validation type, a field is validated to contain a certain combination of alphanumeric characters. For example, the alphanumeric type may require that the information for the field include the letter A or not include certain other characters. Another example of a validation type is currency validation type. If the validation is currency, information for the respective field is validated to determine whether it meets the criteria required for currency. The requirement may include format such as the use of a decimal. If a validation type is a state, the respective is validated to determine whether it is a valid state code. Alternatively the field information is validated to determine whether it is a one of a particular set of state codes or states. If the validation type is a postal code, it is validated to determine whether it is a valid postal code and/or one of a particular set of postal codes.

Similarly, if the validation type is another of these possible validation types, the respective information is validated to determine whether it is a proper form of such type of data. For example, if a validation type is an email, it may be the information may be validated to determine whether it is a valid email address. In one implementation it is determined whether the information is a particular type of expected email address, such as an email receipt from the domain of the payer the payer organization. If the validation type is a conditional, certain information may be validated contingent upon whether other information is present in the information that is attempted to be input. Alternatively if the validation type is a conditional, certain information may be validated depending on other conditions such as time or date or the identity of the seller or membership of the seller in a particular group. Such groups may be defined by the buyer. Custom code 432 allows for other code to be written for other types of validation of information received. Presentation rule 407 determines type of presentation for the invoice associated with the rule set 403. Other presentation forms are possible for the same rule set 403, as shown here, presentation 408 is also associated with rule set 403 in addition to presentation rule 407.

As a rule set is defined, a set of field rules, such as field A rules 405 is determined for each field in the respective invoice format. This collection of field rules forms the rule set for the invoice. A PO check designation POchk 404 determines whether a tolerance should be checked against a purchase order before the invoice is accepted.

Figure 5:
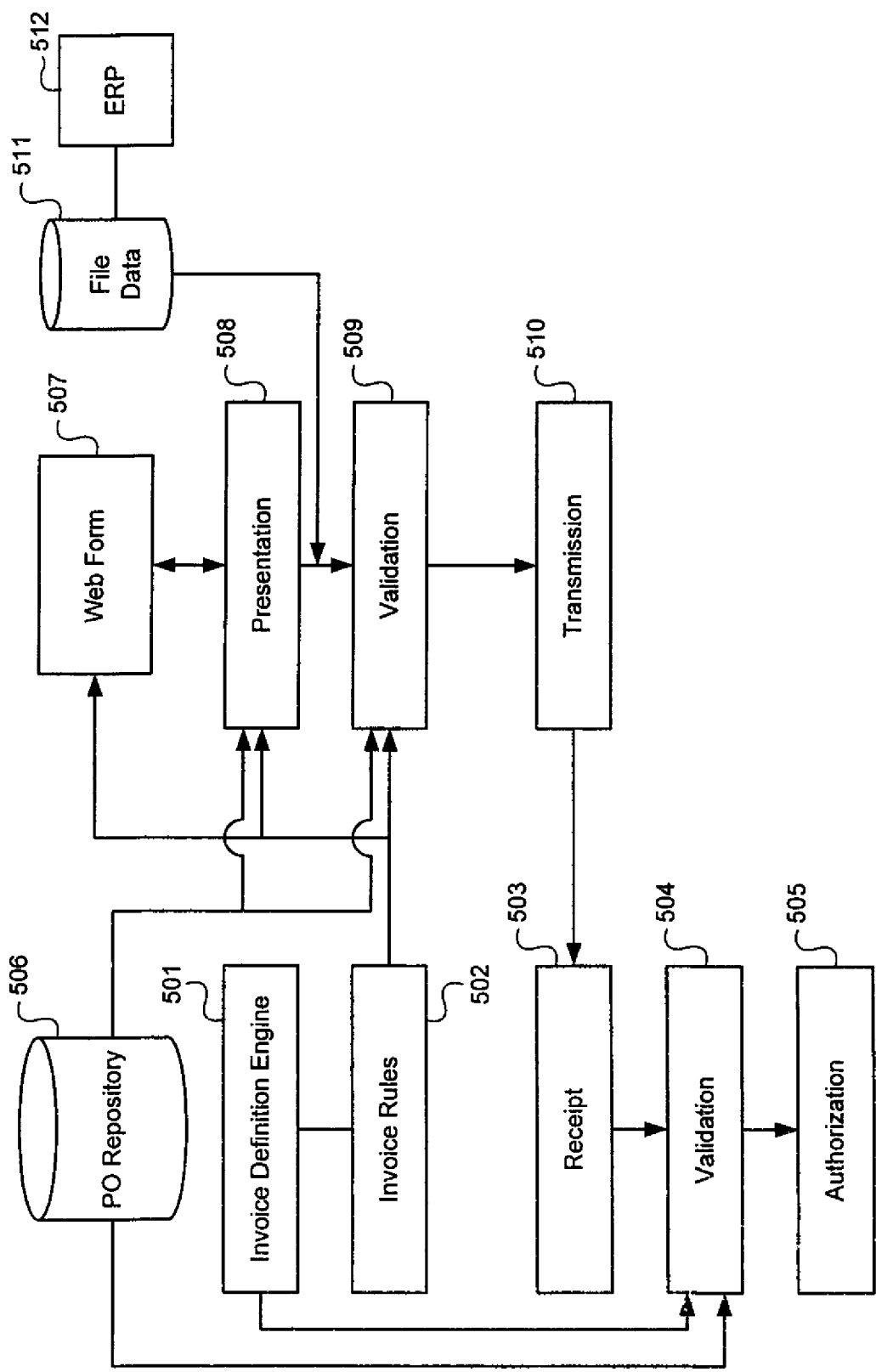
FIG. 5 is a system diagram for invoice creation according to an embodiment of the invention.

FIG. 5 is a system diagram for invoice creation according to an embodiment of the invention. Various methods are available for communicating the invoice definition to the seller system and receiving seller input, according to various embodiments of the invention. According to one embodiment of the invention, the defined invoice is presented to the seller system in the form of a web form. Such a web form may be communicated by the World Wide Web and displayed in Hypertext Markup Language (HTML) format in a web window. Alternatively, the invoice information may be presented by taking a purchase order under which the goods were ordered and converting such information into the respective invoice. Such purchase order may be stored a purchase order repository. Alternatively, the invoice may be created from a file stored by the seller system based on the invoice definition.

As shown here a system is available to create the invoice definition and to have an invoice generated by the seller system based on such invoice definition. The system includes invoice definition engine 501 and invoice rules generated from such invoice definition 501, which are associated with a system controlled by the buyer. Presentation logic 508 allows for a presentation of the invoice to the seller using the seller system. Presentation logic 508 is coupled with Web form 507 and validation 509 of a seller's system. Presentation 508 also communicates with PO repository 506. Validation 509 is in communication with presentation 508 for receipt of invoice input and is in communication with transmission 510 in order to transmit the completed invoice. File data 511 received from ERP 512 is communicated into validation logic 509.

Receipt logic 503 is associated with a buyer system and receives an invoice transmitted from transmission logic 510. Such receipt logic 503 is in communication with validation logic 504 for validating the respective invoice received. Validation logic 504 is in communication with authorization logic 505, which is also implemented in the buyer's system. Validation logic 504 is in communication with PO repository 506.

An invoice definition is generated as a set of invoice rules by invoice definition engine 501. Such invoice rules are available for use for invoice information input by the seller system through presentation logic 508 and may be communicated with a seller through Web form 507. Alternatively, the invoice rules may be used to control input of invoice information as dependent on the purchase order that was used as stored in PO repository 506. In yet another alternative, the invoice information is received directly from file data without user direct interaction such as shown here with file data 511. File data 511 receives data from ERP 512 and communicates such data into validation logic 509. Based on the invoice rules 501, validation logic 509 validates invoice information provided by the seller system. Upon completion of processing by validation logic 509 on such input information, an invoice is completed and transmitted by transmission logic 510 to the buyer system.

The invoice is received by receipt logic 503 of the buyer's system. The invoice is validated by validation logic 504 based on invoice rules 502 and also optionally based on the respective purchase order stored in PO repository 506. After such validation, the invoice is authorized by authorization logic 505. Authorization logic 505 may include logic to route the invoice for appropriate approval and to check the invoice with respect to other criteria.

Figure 6:
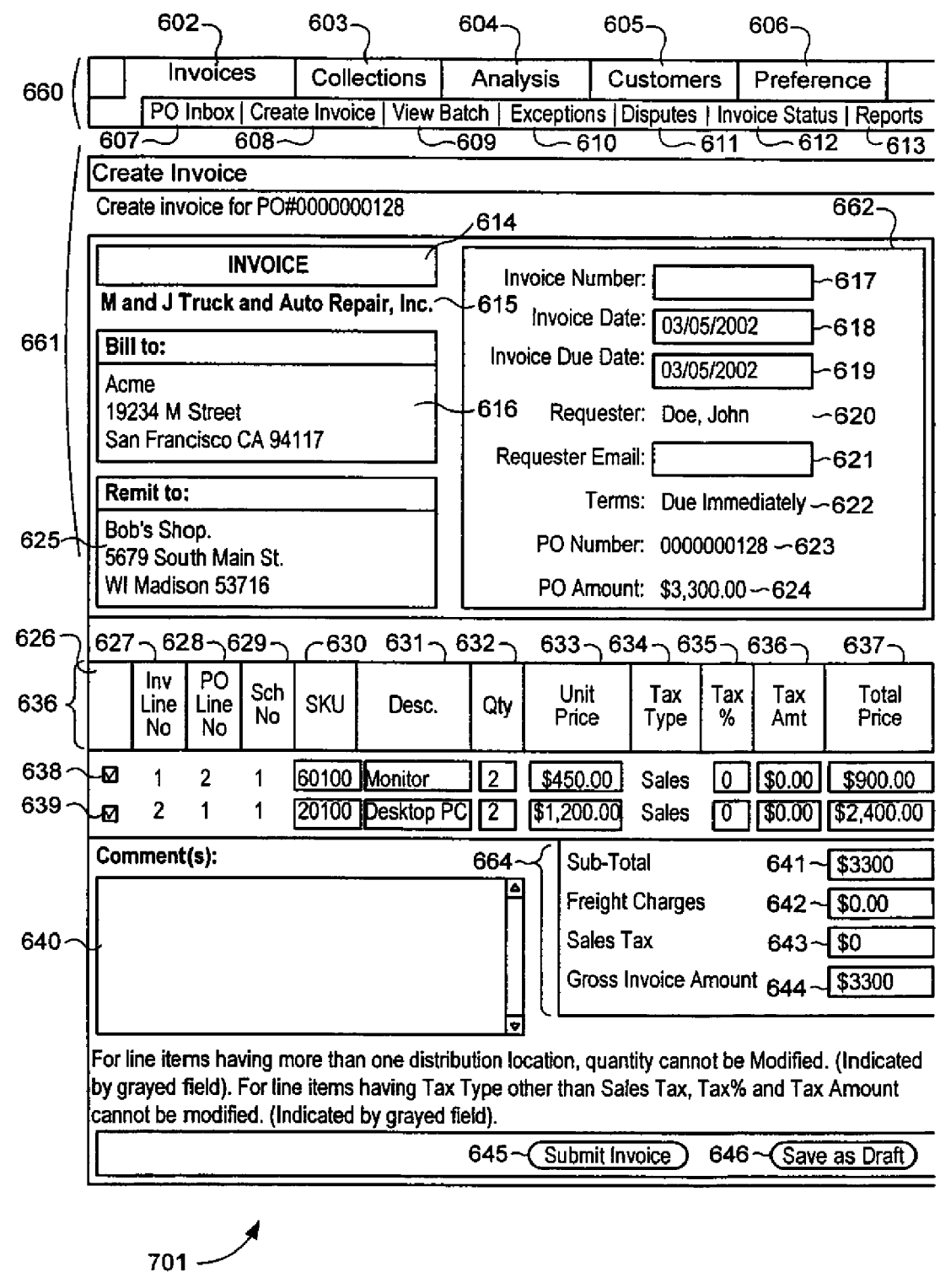

FIG. 6 shows a user interface with an invoice display according to an embodiment of the invention. The invoice, according to an embodiment of the invention, is defined by the buyer and then presented to the seller on the seller system's user interface. For example, a purchase order of the buyer may be converted into an invoice, according to an invoice definition defined by the buyer. Then this invoice definition is used to display, in conjunction with the purchase order data, an invoice form for the seller. According to one embodiment of the invention, the invoice is pre-populated with data from the purchase order. Additionally, according to one implementation, the seller can then edit the invoice that is based on the buyer's purchase order.

The user interface comprises a window 601 which includes menus 660, name and address information 661, general data 662, item information 663, totals 664 and comments 640. Menu 660 is located generally above other aspects of window 601 and allows for selection of various actions in the seller's system. Here invoice 602 is selected. Other actions include collections 602, analysis 604, customers 605 and preferences 606. Within the category of invoices 701 alternatives exist including PO inbox 607, create invoice 608, view batch 609, exceptions 610, displays 611, invoice status 612 and reports 613. Invoice name and address information 661 includes header 614, name of seller 615, bill to address 616 and remit to address 625. General data input 662 includes invoice number 617, invoice date 618, invoice due date 619, requestor 620, requester e-mail 621, terms 622, PO number 623, and PO amount 624.

Items 663 include various columns of data for each item. For example, items 663 includes selection column 626, invoice line number 627, PO line number 628, schedule number 629, SKU number 630, description 631, quantity 632, unit price 633, tax type 634, tax percentage 635, tax amount 636 and total price 637. Here are shown two line items as row 638 for a "configured monitor" and row 639 for a "configured desktop PC." Totals for the invoice are shown in totals 664. Totals 664 include subtotal 641, freight charges 642, sales tax 643 and gross invoice amount 644. In the bottom of the interface are input buttons allowing the user to submit the invoice 645 or save as draft 646.

In operation an employee of the seller can select the appropriate category from menu 660 such as invoice 602 which allows the user to edit or create an invoice. PO inbox 607 selection allows the user to view, edit or create an invoice from an existing purchase order when a new invoice is created. Fields such as bill to address 616 and remit to address 625 may be pre-populated with data from the purchase order when a new invoice is created. Similarly, other fields such as those in data fields 662 and items 663 may be pre-populated with data from the purchase order. Additionally, the types of inputs such as bill to address 616, invoice number 617 and row 638 may be defined as fields of the invoice definition created by the buyer. The fields may also be a result of the respective fields in the purchase order. After reviewing the data in the purchase order or in the invoice that was pre-populated with the purchase order, the user can edit this data and add supplemental information for the invoice. The information edited and added by the user is verified then using the rules associated with the respective invoice definition. In such verification process the data the user attempts to input is rejected or a warning is provided and the data is accepted, depending on how the field is configured. Once the process of filling in the invoice is completed and the invoice data has been verified and accepted, an invoice is prepared and submitted to the buyer.

Although the user interface 601 as shown may be used for a conversion of a purchase order into an invoice, in one implementation the same or similar layout is also used as a Web-based form for input of invoice data according to the invoice definition. In the Web-based form the invoice fields are shown as defined by the buyer system. The particular layout and arrangement may be varied selectably by the buyer, according to an embodiment and the invention such that the layout may appear different from that shown in FIG. 6. When the invoice is completed and submitted to the buyer, a similar user interface may optionally be used to display the invoice in the buyer system.

FIG. 7 is an illustration of a user interface for invoice mapping according to an embodiment of the invention. According to one embodiment of the invention, data is placed into an invoice based on file data from the seller system. A mapping is created between the file format of the seller's data and the invoice definition. Thus, it is determined which particular locations of the file of the seller's data correspond to which particular fields of an invoice. The user interface shown helps to provide such a mapping. The user interface 740 is in the form of a window or Web-based display. Interface 740 includes menu 741, file contents window 713, mapping matches 742, exceptions 729 and submission input 730. Menu 741 includes invoice administration 701, collections administration 702, analysis administration 703, customer administration 704 and preferences administration 705. Invoices selection 701 includes PO inbox 706, create invoice 707, view batch 708, exceptions 709, disputed 710, invoice status 711 and reports 712. Matchings 742 includes: element ID 714, element code 715, required input 716, data type 717, field name 718 and mapped value 719.

The user is able to use interface 740 in order to review, and in one implementation, create, the mappings between file items and invoice fields. As shown here, for example, element ID column 614 includes elements 720-728, which represent different locations in the input file. These items are mapped with corresponding invoice fields as shown here with field name 718. Field name is an alphanumeric name for the field which allows for easy matching between the file location and the respective field of the invoice. The field name corresponds to an actual field in the invoice definition. The field name may correspond to a pre-defined field name that is used by different buyers and differently configured in various different buyers' own invoice definition. However, the field names may be used universally, according to one embodiment of the invention.

As shown, mapping has been created between various file elements and respective fields. For example, element N101 720 has been mapped to a field entity code ID. The actual mapped value in the file that corresponds to entity code ID is shown as PE. Exceptions may be shown here with exception window 729. Exceptions indicate that data in the file did not correspond properly with respective field. Such exceptions may be generated based on the rules for the field, according to one embodiment of the invention. Alternatively, other criteria may be used as requirements for data and corresponding exceptions may be generated. File contents window 713 shows the contents of a particular file that is being used to create this matching.

The user interface shown 740 is currently shown with view batch 708 selected. Such a window allows for checking of a file according to a pre-defined mapping. In using such window, exceptions can be displayed where the items in the file do not correspond to the pre-defined matching such as with exceptions window 729. Although the interface is currently shown as a view batch mode, a similar interface may be used for the creation of the mapping in one implementation.

Figure 8:
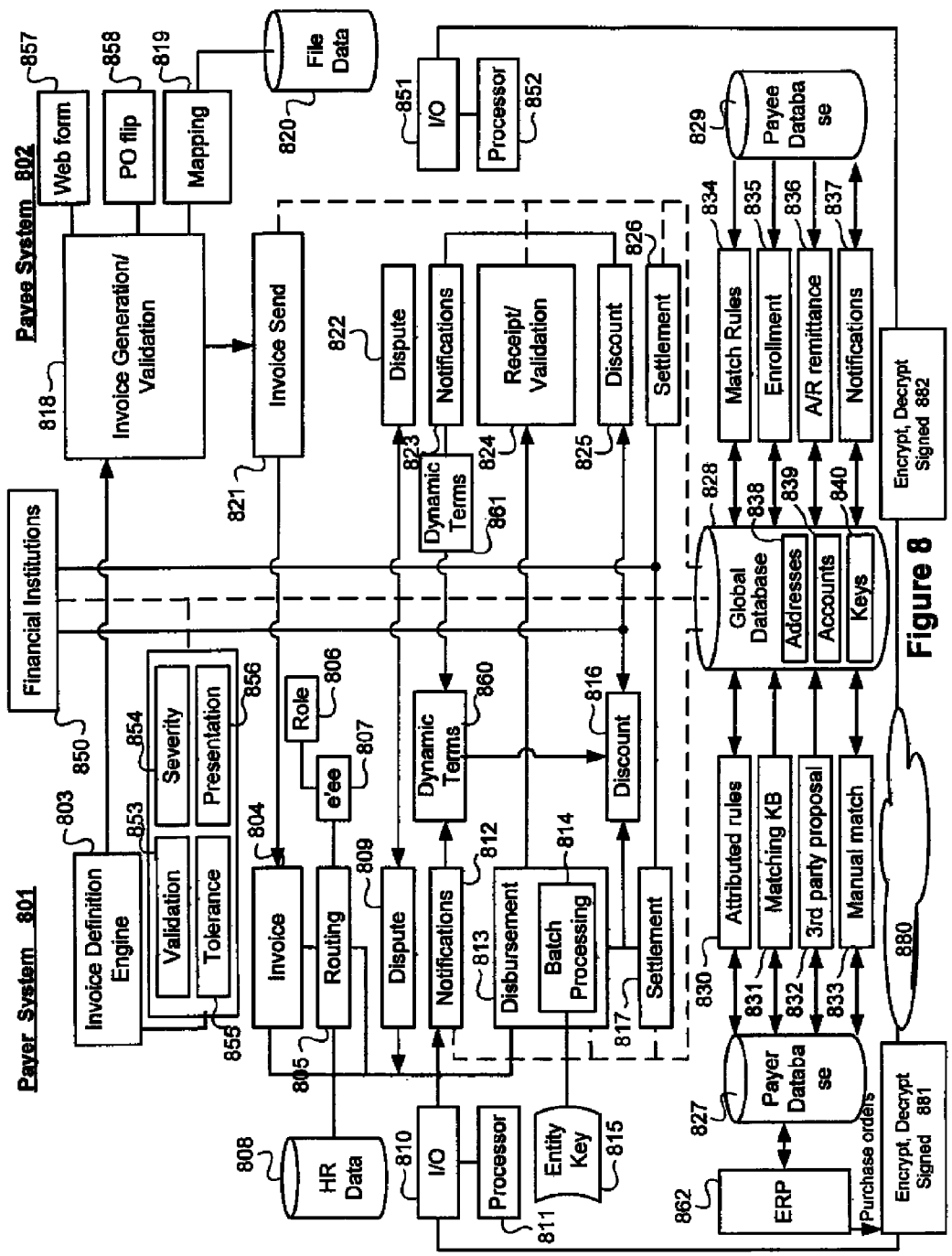
FIG. 8 is a block diagram of a system according to an embodiment of the invention.

FIG. 8 is a block diagram of a system according to an embodiment of the invention. The system allows a paying entity to define the invoice format for invoices it wishes to receive. The system facilitates routing, editing, dispute resolution, and disbursement of payment. The system includes payer (buyer) shown as 801, payee (vendor) shown as 802, and financial institutions shown as 850. The system has the following characteristics according to one implementation: collaborative network model, A/P (buyer) centric enterprise software, plugging into existing ERP systems, full cycle bill-to-pay functionality, web-based A/R (vendor) software, and co-existence with the customer existing bank relationships.

The collaborative network model supported by the unique collaborative vendor reconciliation engine between global directory shown as 828 and A/P centric master vendor list shown as 827. The reconciliation engine provides methods of matching existing vendor name/address with self enrolled vendor information in the global directory. These methods include: fuzzy attributed weight based matching shown as 830, previous vendor histories of matching in the knowledge based shown as 831, third party outsourced recommended matching proposal shown as 832, and manual interactive selection from buyers shown as 833. Each vendor is represented by several critical attributes in the global directory: addresses shown as 838, real and alias accounts shown as 839, and keys shown as 840. Vendor entries are pre-populated with information uploaded from the buyer ERP system. The vendor enrolls via the online self-service enrollments 835. Vendor also provides additional rules to match 834, A/R remittance format attributes 836, and notification rules/addresses 837.

Accounts payable (A/P) buyer-centric enterprise software associated with payer system 801 includes several key unique functions. These functions include buyer defined electronic invoice exchange, routing/editing and approval, and dispute resolution. Payer system 801 includes invoice definition engine 803, invoice 804, HR organization data 808, routing/editing logic 805, dispute logic 809, notifications logic 812, disbursement logic 813, dynamic terms logics/offers 860, discount logic 816 and settlement logic 817. Also included on payer system 801 are input output (I/O) 810, processor 811, entity key 815, and payer central repository database 827. The invoice definition engine 803 includes validation logic 853, tolerance/replacement items 855, interaction severity 854, and several presentation forms 856. This definition engine is controlled by payer helps provide clean invoice data from payees. The definition logics (853, 854, 855, and 856) can be configured to specific payee or a specific group of payees.

Invoice definition engine 803 and its definition logics are exposed to payee via global directory and are operative with invoice definition/generation/validation 818 of payee system 802. The routing/editing logic 805 includes business logic that governs how an invoice will be processed by AP clerks, and what data entry information will be required to complete the transaction. Routing/editing logic 805 can operate differently based on multiple attributes: document type, document value, discount value, etc. Routing/editing logic 805 acts on HR organization database 808 to define routing/editing/approval work flow based on employee information 807 and role values 806. Invoice 804 is coupled into routing logic 805. Routing logic 805 is coupled with employee logic 807 and role assignment 806. Routing logic 805 is coupled with HR data 808 and with dispute logic 809, notifications logic 812 and disbursement logic 813 of payer system 801. Notification logic 812 is configured by the payer, and includes collaborative filtering, and mappings status and notification definitions between internal to external payees. These collaborative filtering and mappings can be designated to a payee or a group of payees.

Dispute logic 809 is set of payer defined centric collaboration rules and interactions between payer and payee to resolve issues related to invoice or other exchanged documents. Some disputes are simple (e.g., number of items is received, etc.) while others are more complex (e.g., replacement items do not meet part specification and price). The outcomes of a dispute are partial payments, partial invoices, new invoices, or other outcomes. According to one implementation, a dispute can only be finalized by payer and its members, and some finalized exchanges will require digital signature to ensure non-repudiation. The payer dispute logic 809 orchestrates with payee dispute logic 822. Payer dispute logic, references, and history are stored in payer central repository 827.

A/R web based centric software associated with payee system 702 helps provide an online self-service payee system. Payee system 702 includes a processor 852 and input/output (I/O) 851. Such processor 852 and input/output 851 allow for communication with other entities such as payer system 801, financial institutions 850 and global database 828. Processor 852 and processor 811 of payee 802 and payer 801 respectively may run various software processes to implement the logic shown. The processes may be implemented as software objects, routines or other software processes, programs or implementations. Alternatively, portions of such logic may be implemented in hardware logic or other forms of logic. The functions shown may alternatively be implemented on a common server or in a distributed set of computer systems separated over a computer network, or other configuration that achieves the logical functions shown. Data and information such as for global database 828 may be stored in data structures or other data format and stored in computer memory, fixed storage or other data storage or archived in various implementations of the invention.

Payee system 802 includes invoice generation/validation logic 818, invoice send logic 821, dispute logic 822, notifications logic 823, receipt/validation logic 824, discount logic 825 and settlement logic 826. Invoices or other documents can be submitted to payer via multiple mechanisms. Three sample mechanisms are shown here: Web forms shown 857, purchase order pre-populated invoice (PO flip) 858, and electronic file submission via file mapping 819. The Web forms 857 are a set of payer defined presentations that can be selected and/or authorized to be used by payee(s). Payee can also define additional payee private attributes and fields to be used during A/R matching as well as graphic materials (such as company logo, etc.). The PO flip 858 uses information from purchase orders which are transmitted to payee from payer to pre-populate the invoice data. The status of each purchase order is maintained within the payee central repository to support blanket purchase orders. File mapping 819 is used by the payee to automate the bulk invoice submission process. Normally, these file are exported from payee's A/R system. The mapping defines how payee's data will be mapped into payer, as well as default/validation/transformation rules. Upon submission of these invoices or other documents via multiple mechanisms (857, 858, 819). The documents are validated based on the payer definition engine 818. This definition engine 818 includes payer definition engine 803 and its components: validation 853, severity 854, tolerance 855 and presentation 856.

Invoice generation/validation logic 818 is coupled with mapping logic 819 in communication with file data 820. Invoice generation/validation logic 818 is coupled into invoice send logic 821. Dispute logic 822 is coupled with dispute logic 809 of payer system 801. Notifications logic 823 is in communication with notifications logic 812 of payer system 801 and discount logic 825 of payee system 802. Receipt/validation 824 of payee system 802 is in communication with disbursement module 813 of payer system 801. Settlement logic 826 is operative with discount logic 825 of payee system 802 and receipt/validation logic 824.

Global database 828 is available to notifications logic 812 and 823, disbursement logic 813, settlement logic 817 and 826, invoice send logic 821, receipt 821 and receipt/validation logic 824. Global database 828 is in communication with payer database 827 through attribute match rules 830, knowledge based history matching samples 831, third party recommendation/proposal 832 and manual interactive matching by payers 833. Global database 828 is in communication with payee database 829 through match rules 834, enrollment logic 835, remittance formats 836 and notification preferences 837. Global database includes items such as address 838, accounts 839 and public keys 840. Payer database 827 is located with payer system 801 and payee database 829 is located with payee system 802. Global database 828 is also available to financial institutions 850.

Through invoice definition engine 803 a payer uses payer system 801 to define the invoice that the payer wishes to receive. Such definition helps to increase efficiency in the payer system because the resulting invoice from the payee; such as a seller, is more likely then in the proper data format when it is received. Payee system 802 generates an invoice based on the defined invoice in invoice generation/validation logic 818. The input data for the invoice is validated based on the invoice definition rules defined in payer system 801. If file data is used to automatically map into an invoice, such mapping is performed in one embodiment of the invention by mapping logic 819. Mapping logic 819 receives the file data 820 with information to be populated into respective invoices. File data 820 may contain files with data for invoices for various payers who have purchased good or services from the payee. When an invoice is completed it is sent through invoice send logic 821 to payer system 801.

An invoice is received at payer system 801 as shown here with invoice 804. The invoice is routed to the respective employees or other agents for its review and approval. Some approval may require additional signatures according to one embodiment of the invention. As shown here, employee logic 807 is in communication with routing logic 805 to allow an employee to authorize, audit or view respective invoice or check information.

Routing logic 805 is also used to route checks or other documents to various employees for signature or approval using HR data 808. Routing logic 805 uses HR data 808 to determine the correct employees to whom to route the respective document, such as in an invoice or check. Routing may be made to the manager of a respective employee if the employee has not responded in a certain time to the document. Such the choice of such manager to whom to route is made based on the management hierarchy in the organization stored in HR database 808. Such database is extracted from a human resource management system (HRMS), in one implementation of the invention. Additional information regarding routing of documents in the system is described in United States patent application entitled Method and System for Invoice Routing and Approval in Electronic Payment System, U.S. patent application Ser. No. 10/155,853, invented by Bob Moore and Xuan (Sunny) McRae, and which is incorporated herein by reference in its entirety.

A user of payer system 801 may dispute an invoice or other payment request through dispute logic 809. Dispute logic 809 is in communication with dispute logic 822 of payee system 802. This allows for communication regarding a dispute between a payer and a payee. The dispute may be only initiated and finalized by a payer. According to one embodiment of the invention, the dispute may be finalized only by the buyer, or the payer system. The dispute includes the capability to indicate that particular items in an invoice are disputed, such as the tax. The dispute logic 809 and 822 include the capability for individuals using the payer system 801 using payee system 802 to engage in a chat dialog. For additional discussion regarding electronic dispute resolution in such a system, refer to United States patent application entitled Method and System for Buyer-Centric Dispute Resolution in Electronic Payment System, U.S. Pat. No. 7,437,327, invented by Duc Lam, Celeste Wyman and Xuan (Sunny) McRae, which is incorporated herein by reference in its entirety.

Notifications logic 812 communicates completion of various stages of approval or other issues of status regarding invoices and disbursement. For example, when an invoice is approved notifications logic 812 communicates a notification to notifications logic 823 of payee system 802. Based on such notifications, a discount may be enabled through discount logic 816, which is in communication with discount logic 825 of payee system 802. For example, where an invoice is approved, a discount may be enabled based on an agreement or outstanding dynamic terms offers shown as 860 that the corresponding payment is made earlier than required under the original terms and conditions. Dynamic terms are additional real-time terms, a set of rules, and/or goal seeker that are established by payer 860 or payee 861. These dynamic terms rules 860 and 861 are based on business event types (invoice approval, purchase order approval, etc.), a payee or group of payee and a set of new discrete or variable terms. These dynamic term goal seekers allow payer and payee to set desirable outcomes. These dynamic terms can be pre-negotiated up-front or in real-time based on business event types. The approval of these new terms may require digital signature of either payer or payee. Also, third party financial institutions could be involved to provide funding for payee in returns for early discounts. For additional information regarding discounts facilitated by the system, dynamic terms (860 and 861) and discount logic 816 and 825 please refer to US patent application entitled System and Method for Varying Electronic Settlements between Buyers and Suppliers with Dynamic Discount Terms, U.S. patent application Ser. No. 10/155,805 (Abandoned), invented by Don Holm, Duc Lam and Xuan (Sunny) McRae, which is incorporated herein by reference in its entirety.

To facilitate complete bill-to-payment functionality, the system in FIG. 8 includes disbursement logic 812 and settlement logic 817. Disbursement logic 813 includes all payment routing, signing, and approval logic for respective invoices or other requirements for payment. Some payments will require multiple signatures to be signed based on payment amount and/or destination payee(s). Digital signatures and nondigital signatures may both be used. Also, payer can configure to control new settlement date for the payment by defined payee group and number of business/calendar days to be adjusted. The disbursement logic also includes auditing capability with multiple levels based on number of signatures and/or amount. In one implementation, disbursement logic 813 makes such disbursement in the form of electronic checks in one implementation. Such electronic checks are generated and signed with a digital signature. The digital signature may be obtained from respective users such as through a routing process using routing logic 805 to obtain a signature from employee logic 807 with role assignment digital key 806.

Alternatively, a set of instructions may be received to send a set of checks that use a digital signature of the payer organization rather than the digital signature of an employee. Such check processing may be accomplished through batch processing logic 814 and disbursement logic 813. Such batch processing logic 814 uses an entity key 815, which is a private key of the payer's organization. Batch processing logic 814 requires particular authorization for the respective instruction. The authorization may require that the agent requesting the set of checks sign the instruction with the agent's private key. Receipt/validation logic of payee system 802 is in communication with disbursement logic 813. Receipt/validation logic 824 receives payment, such as in the form of electronic checks. Such electronic checks are validated to assure that they are accurate. Receipt/validation logic decrypts any encrypted documents, for example if the electronic checks are encrypted with the public key of payee system 802, such checks are decrypted. Additionally, the digital signature of the sender is authenticated in receipt/validation logic 824. Such authentication is accomplished using the public key of the payer, which corresponds to the private key of the payer's organization (entity key 815) that was used in batch processing logic 814 (entity key 815). Additionally, verification may be made against a payment database generated by the payer system when the checks are created in order to assure that the checks were actually sent by the payer system. Additional information regarding disbursement 813 and batch processing 814 is contained in United States patent application entitled System and Method for Electronic Authorization of Batch Checks, application Ser. No. 10/155,800, invented by Duc Lam, Matthew Roland and Xuan (Sunny) McRae, which is incorporated herein by reference in its entirety.

Settlement logic 817 allows for settlement of payment between a payer system 801 and payee system 802. Settlement mechanism includes exiting combination of paper based checks, standard domestic electronic payment network (Fed Wire, ACH, CHIPS, etc.), international electronic payment networks (SWIFT, Bolera, etc.), propriety private payment networks (VISA, MasterCard, and American Express, etc.), and internal account bank transfer (On-us, etc.) For example, settlement may be made through debits and credits in a database within the system. Alternatively, settlement may be performed through an external network such as the ACH network with financial institutions involved, such as financial institutions 850.

Settlement logic 817 supports standard fund transfer model (buyer's account will be debited and supplier's account will be credited.) and good funds model (buyer's account will be debited and a temporary account will be credited. Upon receiving fund availability in temporary account, the supplier will be credited). Settlement logic 817 is implemented via issuing requests to the settlement network. Such request can be file-based requests such as ACH or transactional request such as VISA networks. For each request, there will be associated confirmation ID to ensure the trace ability of each transaction.

Global database 828 is available for use by elements that send payment, such as disbursement logic 813 and settlement logic 817. Global database 828 is also available for elements that send other documents or information between payees and their respective financial institutions. For example, invoices may be sent based on the respective recipient address as stored in the global database 828. Thus, invoice sends logic 821 is in communication with global database 828.

Global database 828 includes addresses and account information for respective payers and payees who use the system. Links are created between items in the global database and other databases in order to allow for the global database to be updated and the corresponding linked information to continue to be used. Thus, for example, according to one embodiment of the invention, a payer has a separate database, payer databases 827, and matches are created between items, such as addresses or payment entities and payer 827 and respective items in global database 828 through a match generation process 830. Such matched generation process 830 may include providing a user of the payer system 801 with a series of candidate matches between addresses stored on payer database 827 and corresponding spellings of addresses or payment entities in global database 828. The user of payer system 801 is then able to select the best match and create a link between the respective address or payment identification.

This link can then later be used to effect payment to the proper address as stored in the global database. Similarly, a match generation between items in payee database 829 and global database 828 can be performed so that payee system 802 can send items to the proper recipient using information in global database 828. Enrollment logic 835 is available to enroll new entities as payees into the global database to make them available for use by payer system 801 or payee system 802.

The links established are then available to allow for use of information in the respective payer database 827 and payee database 829 in order to find recipients to whom documents or payments are to be sent. In addition to address information 838 and account information 839, according to one embodiment of the invention, public keys of various participants in the systems are stored in the global database 828. Such keys are then available for use in order to determine the accuracy of a digital signature sent by a particular entity. Additional information regarding global database 828 and related logic and communication is contained in the United States Patent Application entitled Collaborative Vendor Reconciliation, U.S. patent application Ser. No. 10/155,797, invented by Duc Lam, George Muller, Chandra (CP) Agrawal, Baby Lingampalli, Pavel Lopin and Xuan (Sunny) McRae, which is incorporated herein by reference in its entirety.

In the FIG. 8 system, invoices and other documents are exchanged between payers and payees over the public and internet networks 880. To help provide security and privacy, before they are sent, invoices and other documents are signed with source private key, and encrypted with destination public key shown as 881. Upon receiving invoice or other document, the document is decrypted with its own private key, and validated against source public key to ensure non-repudiation shown as 882.

The system also can integrate with multiple enterprise resource planning (ERP) systems shown as 862. Such ERP systems include: PeopleSoft, SAP, Oracle Financials, etc. The system will integrate with these ERP systems via native and/or standard interfaces. An example of native interface for PeopleSoft is Message Agent, etc. The interfaces include EDI gateway, etc. The system utilizes the ERP to extract documents (purchase orders, invoice status, unit of measurements, vendor list, etc.), to post documents (invoices, vendor information, status, etc.).

The foregoing description of various embodiments of the invention has been presented for purposes of illustration and description. It is not intended to limit the invention to the precise forms described.

We claim:

1. A computer implemented method for submitting an electronic payment to a seller comprising:
   selecting, by the computer, an invoice format provided by a buyer;
   defining, by the computer, a set of rules for accepting information into respective fields of the invoice, wherein the set of rules is provided by the buyer and wherein one of the rules determines whether the seller is able to input information into the invoice;
   receiving, by the computer, an invoice from the seller, the invoice comprising information from the seller for fields of the invoice based on the rules;
   authenticating origination of the invoice using digital signature verification;
   determining, by the computer, if information in the invoice is acceptable or not acceptable, and upon determination that information is not acceptable,
   determining, by the computer using severity logic, if information that is not acceptable is (a) included in the invoice upon providing a warning to the seller, or (b) not included in the invoice;
   routing, by the computer, the invoice for approval and, upon approval;
   submitting, by the computer, the electronic payment to the seller based on the invoice.

2. The method of claim 1, the rules including whether the information is within a particular range of values from corresponding fields in a purchase order under which items associated with the invoice were ordered.

3. The method of claim 2, wherein the range includes a price tolerance.

4. The method of claim 1, the rules including whether the information for at least a particular field conforms to a particular format.

5. The method of claim 1, including selecting the rules from among validation rules of:
   whether a field has legal or illegal characters;
   whether a field has an integer value;
   whether a field has a zero value;
   the number of decimal places in a field;
   the range of number in a field; whether a field has a currency amount;
   whether a field has a negative value;
   whether a value of a field is within a particular range;
   whether a field has a representation of a date value;
   whether a date in a field is in a particular range;
   whether a field has a representation of a state;
   whether a field has a representation of a particular set of states;
   whether a field has a representation of a postal code;
   whether a field has a representation of an e-mail address;
   whether a field has a representation of a telephone number;
   whether a field has a representation of a payment term code;
   whether a field has a representation of a SKU catalog number;
   whether a field has a representation of a cost center; and
   whether a field has a representation of a department.

6. The method of claim 1, wherein at least one rule among the set of rules has a first requirement depending on a first condition and a second requirement depending on a second condition.

7. The method of claim 1, including differently displaying the invoice format to different sellers based on membership of the sellers in groups.

8. A computer system configured to settle an invoice from a seller comprising:
- a programmable computer; and
- a processor configured to:
    - receive an invoice format provided by a buyer;
    - receive a set of invoice fields;
    - for each field in the set, receive a rule provided by the buyer regarding whether information is acceptable for inclusion in the field of the invoice;
    - receive an invoice;
    - authenticate the origination of the invoice;
    - determine, based on the rules provided by the buyer, whether information in the invoice is acceptable or not acceptable;
    - determine if information that is not acceptable is (a) included in the invoice upon providing a warning to the seller, or (b) not included in the invoice;
    - route the invoice for approval, and upon approval; and
    - authorize payment to the seller.

9. The computer system of claim 8, the rules including whether the information is within a particular range of values from corresponding fields in a purchase order under which items associated with the invoice were ordered.

10. The computer system of claim 9, wherein the ranges include a price tolerance.

* * * * *